United States Patent [19]

Seymour et al.

[11] Patent Number: 4,804,145
[45] Date of Patent: Feb. 14, 1989

[54] COMPOST SPREADER

[75] Inventors: Shaun A. Seymour; John B. Crego, both of New Holland; James T. Clevenger, Jr., Lancaster, all of Pa.

[73] Assignee: New Holland, Inc., New Holland, Pa.

[21] Appl. No.: 53,460

[22] Filed: May 22, 1987

[51] Int. Cl.[4] ............................................... A01C 3/06
[52] U.S. Cl. ................................... 239/666; 239/676; 239/679; 239/689; 239/288; 239/499
[58] Field of Search ................ 239/288–288.5, 239/499, 513, 665, 666, 672, 676, 679, 689

[56] References Cited

U.S. PATENT DOCUMENTS

| 704,747 | 7/1902 | Rawley | 239/676 |
|---|---|---|---|
| 882,370 | 3/1908 | Buehler . | |
| 949,173 | 2/1910 | Ellis | 239/666 |
| 1,856,417 | 5/1932 | Hyland | 239/676 |
| 3,076,654 | 2/1963 | Colwill et al. . | |
| 3,084,942 | 4/1963 | Kucera | 239/679 |
| 3,095,202 | 6/1963 | Kucera . | |
| 3,241,841 | 3/1966 | Kucera . | |
| 3,540,661 | 12/1970 | van der Lely | 239/666 |
| 4,187,988 | 2/1980 | Brackbill et al. | 239/662 |
| 4,219,163 | 8/1980 | Hale et al. | 239/662 |
| 4,353,505 | 10/1982 | Kinder | 239/288 |
| 4,597,532 | 7/1986 | Linde et al. | 239/675 |

FOREIGN PATENT DOCUMENTS 845263 8/1960 United Kingdom ................ 239/679

OTHER PUBLICATIONS

Turfco Brochure.

Primary Examiner—Andres Kashnikow
Assistant Examiner—Karen B. Merritt
Attorney, Agent, or Firm—Darrell F. Marquette; Frank A. Seemar; Larry W. Miller

[57] ABSTRACT

A spreader adapted for spreading compost includes a container in which an apron conveyor is disposed to move compost toward a cylindrical brush rotatably mounted at one end of the container for discharging compost therefrom. An adjustable flow gate controls the amount of compost moved toward the brush by the apron conveyor. An adjustable impact plate and an adjustable baffle assembly direct compost discharged from the container by the brush toward the ground. The baffle assembly includes a plurality of directional vanes for properly dispersing the compost. A drape extends around the discharge side of the brush.

5 Claims, 3 Drawing Sheets

Fig. 3
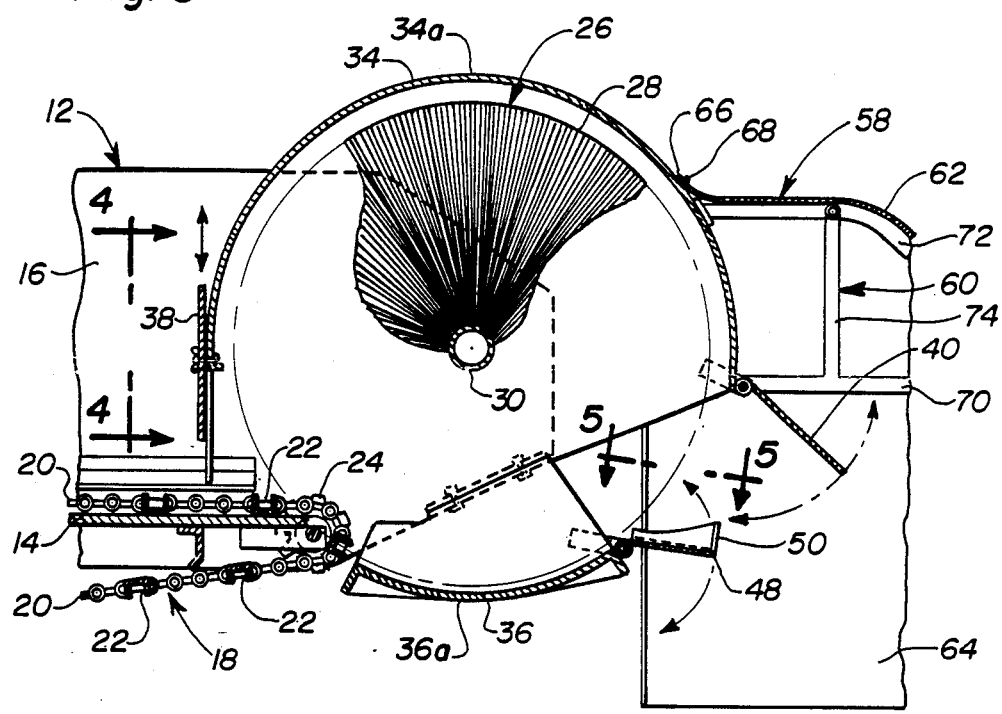
Fig. 4
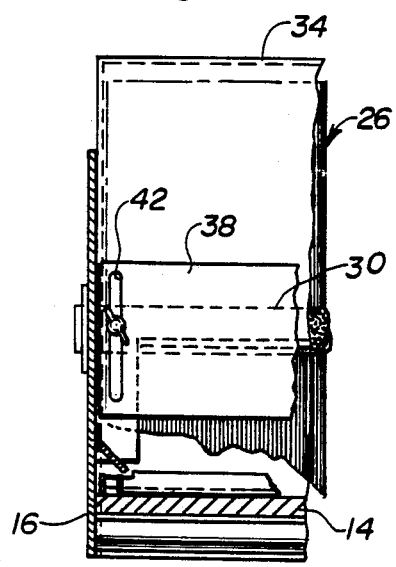
Fig. 5

COMPOST SPREADER

BACKGROUND OF THE INVENTION

This invention relates generally to a type of spreader specially adapted for spreading compost.

Compost is generally defined as any organic material that has undergone a biodegradation process. Typical examples of compost are decomposed leaves, sewage sludge which has been mixed with wood chips or other material to allow air to permeate the sludge, and mushroom soil. Compost is usually applied to golf courses, lawns and parkgrounds as a thin even top dressing. In the past, the proper application of compost has required the use of small machines such as the Turfco Sod Master. Since the capacity of these small machines is very limited, it has become desirable to have a compost spreader of significantly greater capacity.

Box type manure spreaders such as disclosed in U.S. Pat. No. 4,187,988 and side delivery manure spreaders such as disclosed in U.S. Pat. No. 4,597,532 provide the aforementioned greater capacity but have proven unsatisfactory for spreading compost. Box type manure spreaders generally include a rectangularly shaped box with a conveyor in the bottom thereof for moving material toward a discharge beater mounted at the rear of the box. This type of manure spreader is unsatisfactory for spreading compost because it produces a lumpy spread pattern and compost collects on the discharge beater. Side delivery manure spreaders generally include a V-shaped tank with an auger in the bottom thereof for moving material toward an expeller mounted on the side of the tank. This type of manure spreader is not satisfactory for spreading compost because it produces an uneven spread pattern and creates a dust problem due to the high speed of the expeller.

SUMMARY OF THE INVENTION

The present invention provides a spreader adapted for spreading compost including a container for holding compost. The container includes a floor with a front end and a rear end, sidewalls, and a front wall adjacent the front end of the floor. An apron conveyor is disposed in the container for moving compost rearwardly in the container. The apron conveyor has an upper run movable along the floor from the front end to the rear end thereof. A brush is rotatably mounted between the sidewalls of the container adjacent the rear end of the floor for discharging compost from the container. Gate means are provided for controlling the amount of compost moved toward the brush by the upper run of the apron conveyor. Means are also provided for directing compost discharged by the brush toward the ground.

In the preferred embodiment of the spreader, the brush is cylindrical and includes a plurality of bristles. The gate means comprises a plate which is adjustable upwardly and downwardly with respect to the floor and the upper run of the apron conveyor. The means for directing compost comprises an impact plate and a baffle assembly which are adjustable upwardly and downwardly. The baffle assembly includes a plurality of directional vanes carried on a plate. The means for directing compost also comprises a drape extending around the discharge side of the brush.

DESCRIPTION OF THE DRAWINGS

FIG. 3 is an enlarged sectional view taken along lines 3—3 in FIG. 1;

FIG. 4 is a partial sectional view taken along lines 4—4 in FIG. 3; and

FIG. 5 is an enlarged view taken along lines 5—5 in FIG. 3.

DESCRIPTION OF THE PREFERRED EMBODIMENT

Figure 1:
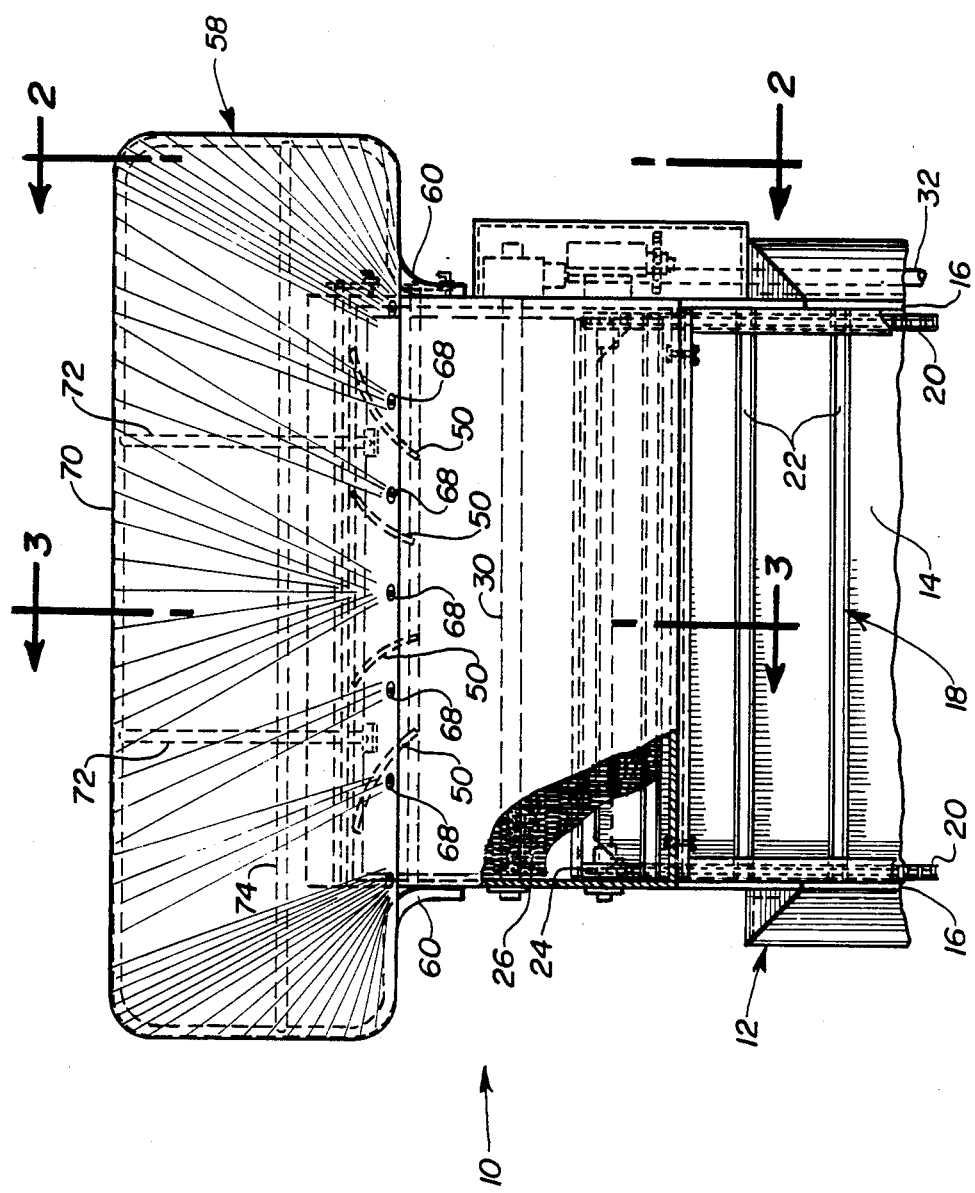
FIG. 1 is a top plan view of a portion of a spreader according to the present invention.

Referring to FIG. 1, a spreader 10 according to the present invention is partially illustrated and includes a rectangularly shaped container or box 12 supported by a frame and wheels (not shown). The box 12 has a floor 14, sidewalls 16 and a front wall (not shown). An apron conveyor 18 movably mounted in the bottom of the box 12 is preferably formed of chains 20 connected together at spaced intervals by slats 22. The apron chains 20 extend around sprockets 24 rotatably mounted at the rear end of the floor 14 and around further sprockets (not shown) rotatably mounted at the front end of the floor 14. The sprockets 24 are driven in conventional manner from the PTO of a tractor to move the upper run of the apron conveyor 18 along the floor 14 from the front end toward the rear end thereof.

A large cylindrical brush 26 is rotatably mounted between the sidewalls 16 of box 12 adjacent the rear end of the floor 14. The brush 26 preferably consists of metal bristles 28 on an elongated tube 30. A shaft 32 driven from a tractor PTO rotates the brush 26 in a counterclockwise direction as viewed in FIGS. 2 and 3 to discharge compost from the box 12. A shroud 34 is disposed over the brush 26, and a pan 36 is disposed under the brush 26. The shroud 34 consists of an arcuate main portion 34a and flat end portions 34b. The pan 36 also consists of an arcuate main portion 36a and flat end portions 36b which are bolted to the flat end portions 34b of the shroud 34.

As best seen in FIGS. 3 and 4, a flow gate 38 is adjustably mounted on the inner side of the shroud 34 and an impact plate 40 is adjustably mounted on the outer side of the shroud 34. The flow gate 38 is in the form of a flat rectangular plate which extends between the sidewalls 16 of box 12 and has elongated slots 42 formed therein so that the gate 38 may be adjusted upwardly and downwardly with respect to the floor 14 and the upper run of the apron conveyor 18. Proper adjustment of the flow gate 38 will provide the desired thickness of compost that is spread. The impact plate 40 extends the full width of the shroud 34 and is pivotally mounted thereto so that it may be properly adjusted to direct the flow of compost against the ground. Upward and downward adjustment of the impact plate 40 is accomplished by a lever 44 fixed to the impact plate 40 which carries a pin engageable in one of a series of holes in a bracket 46 that is secured to one of the end portions 34b of the shroud 34. Since compost is often sticky, the impact plate 40 is preferably covered with a plastic material to reduce the tendency of compost clinging to the impact plate 40.

A baffle assembly 48 pivotally mounted on the pan 36 includes a plurality of directional vanes 50 carried on a plate 49. The baffle assembly 48 is adjusted upwardly and downwardly as indicated in FIG. 3 by utilizing a lever 52 fixed thereto such that a pin carried by the lever 52 is engaged in one of a series of holes formed in a bracket 54 mounted on one of the end portions 36b of the pan 36. Arcuate slots 56 are provided in the plate 49 to permit angular adjustment of the vanes 50 as indicated in FIG. 5. When properly adjusted, the vanes 50 evenly disperse the compost discharged by the brush 26.

A drape 58 formed of a flexible material such as a suitable fabric is supported by a framework 60 and extends around the discharge side of the brush 26. The drape 58 includes an upper portion 62 and a lower portion 64. The upper portion 62 is releasably fastened along its edge 66 to the shroud 34 by snaps 68 while the lower portion 64 extends downwardly around the impact plate 40 and the baffle assembly 48. The framework 60 is preferably formed of metal and includes a peripheral member 70 attached at its ends to the end portions 34b of the shroud 34. The framework 60 also includes cross members 72 attached at their ends to the main portion 34a of shroud 34, and another cross member 74 connecting the peripheral member 70 and the cross members 72.

Figure 2:
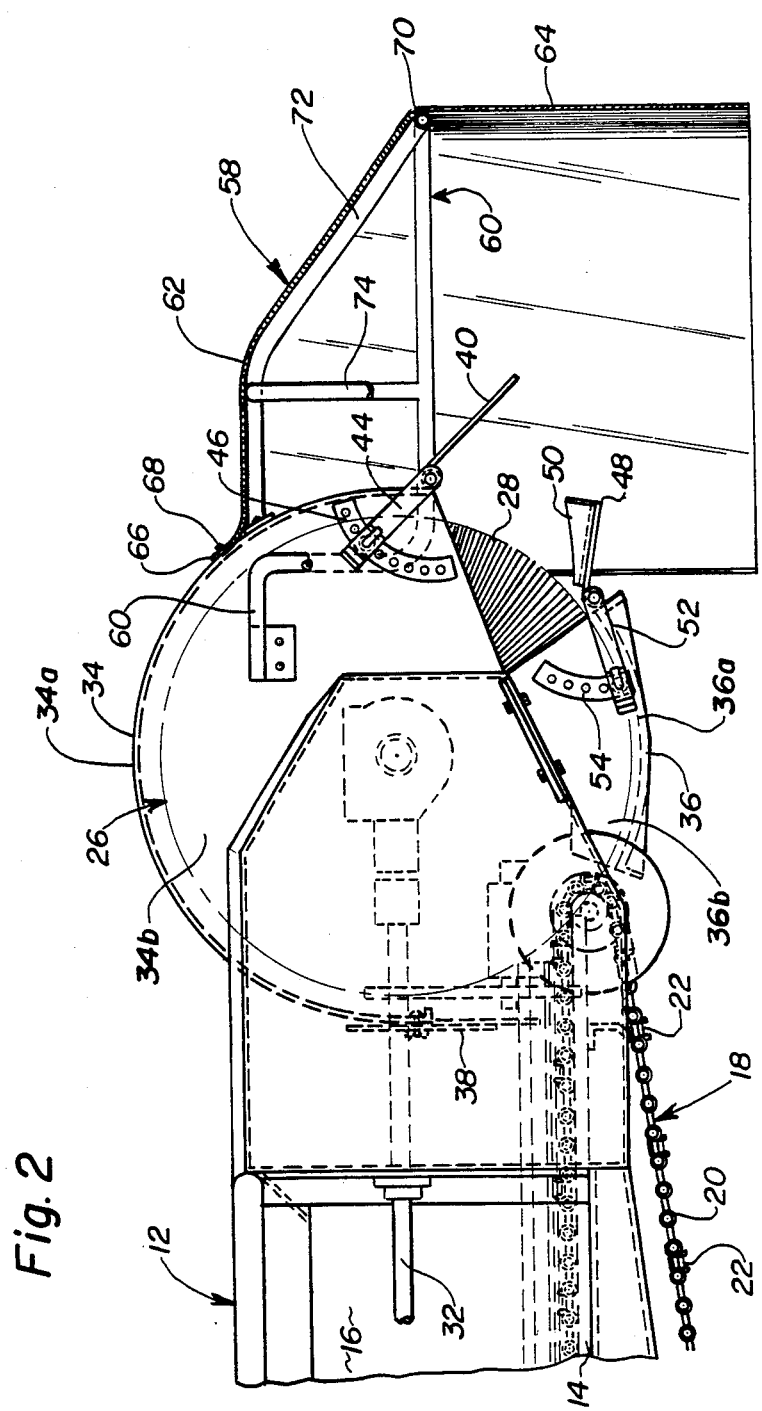
FIG. 2 is an enlarged view, partly in section, taken along lines 2—2 in FIG. 1.

During operation, the spreader 10 is towed by a tractor and compost contained in the box 12 is moved rearwardly by the apron conveyor 18 past the flow gate 38 toward the brush 26 which is rotating in a counterclockwise direction as viewed in FIGS. 2 and 3. The brush 26 discharges the compost from the box 12 outwardly against the impact plate 40, the baffle assembly 48 and the drape 58 which together in turn direct it downwardly onto the ground in a thin even spread pattern without creating a dust problem. The width of the spread pattern will be the same as the width of the drape 58. When spreading wet compost, the impact plate 40 should be adjusted downwardly as shown in FIG. 3 to help break up any large clumps in the compost. However, when spreading dry compost, the impact plate 40 should be adjusted upwardly as shown in FIG. 3 to allow proper dispersion of the compost. The baffle assembly 48 will be adjusted upwardly or downwardly as seen in FIG. 3 depending upon the consistency and type of compost being spread. For example, when spreading thick pasty compost, the baffle assembly 48 should be adjusted upwardly.

Having thus described the invention, what is claimed is:

1. A spreader adapted for spreading compost comprising:
   a container for holding compost, said container having a floor with a front end and a rear end, sidewalls, and a front wall adjacent the front end of said floor;
   an apron conveyor disposed in said container for moving compost rearwardly in said container, said apron conveyor having an upper run movable along said floor from the front end to the rear end thereof;
   a brush rotatably mounted between the sidewalls of said container adjacent the rear end of said floor for discharging compost from said container;
   a shroud disposed over said brush;
   gate means disposed forwardly of said brush for controlling the amount of compost moved toward said brush by the upper run of said apron conveyor;
   means for directing compost discharged by said brush toward the ground, said directing means including a drape mounted on said shroud extending around the discharge side of said brush and an impact plate adjustably mounted on said shroud underneath said drape rearwardly of said brush, said impact plate extending substantially the full length of said brush; and
   a pan disposed under said brush, said directing means further including a baffle assembly adjustably mounted on said pan and positioned below said impact plate, said baffle assembly being adjustable upwardly and downwardly with respect to said impact plate, said baffle assembly including a plurality of directional vanes which are angularly adjustable to evenly disperse the compost discharged by said brush.

2. The spreader of claim 1, wherein said brush is cylindrical and includes a plurality of bristles.

3. The spreader of claim 2, wherein said gate means comprises a plate which is adjustable upwardly and downwardly with respect to said floor and the upper run of said apron conveyor.

4. The spreader of claim 1, further comprising a framework attached to said shroud for supporting said drape.

5. The spreader of claim 4, wherein said drape has an upper portion fastened to said shroud and a lower portion extending downwardly around said plate and said baffle assembly.

* * * * *